US006975673B1

(12) United States Patent
Rouquette

(10) Patent No.: US 6,975,673 B1
(45) Date of Patent: Dec. 13, 2005

(54) NARROW-BAND INTERFERENCE REJECTING SPREAD SPECTRUM RADIO SYSTEM AND METHOD

(75) Inventor: Robert E. Rouquette, Kenner, LA (US)

(73) Assignee: Axonn, L.L.C., New Orleans, LA (US)

( * ) Notice: Subject to any disclaimer, the term of this patent is extended or adjusted under 35 U.S.C. 154(b) by 0 days.

(21) Appl. No.: 09/720,270

(22) PCT Filed: Jul. 14, 1999

(86) PCT No.: PCT/US99/14146

§ 371 (c)(1),
(2), (4) Date: Feb. 23, 2001

(87) PCT Pub. No.: WO00/04657

PCT Pub. Date: Jan. 27, 2000

Related U.S. Application Data

(60) Provisional application No. 60/092,839, filed on Jul. 14, 1998.

(51) Int. Cl.[7] ............................................. H04B 1/707
(52) U.S. Cl. ...................... 375/149; 375/355; 375/145; 375/284; 375/285
(58) Field of Search ............................... 375/146–149, 375/142, 144, 130, 317, 346, 349, 350, 145, 375/362, 355, 284, 285; 342/463; 370/201; 455/63.1

(56) References Cited

U.S. PATENT DOCUMENTS

| 4,613,978 A | | 9/1986 | Kurth et al. ................ 375/346 |
| 5,271,038 A | * | 12/1993 | Cai ............................ 375/317 |
| 5,377,223 A | | 12/1994 | Schilling .................... 375/146 |
| 5,612,978 A | | 3/1997 | Blanchard et al. .......... 375/350 |
| 5,640,416 A | | 6/1997 | Chalmers ................... 375/147 |
| 5,671,247 A | | 9/1997 | Souissi et al. ............. 375/144 |
| 5,852,630 A | * | 12/1998 | Langberg et al. ........... 375/219 |
| 5,999,561 A | * | 12/1999 | Naden et al. ............... 375/142 |

OTHER PUBLICATIONS

Laster et al. (Interference Rejection in Digital wireless communications, IEEE signal processing magazine, May 1997).*
Kohri, T. (Spread Spectrum Techniques and Applications, 994. IEEE ISSSTA '94, IEEE Third International Symposium on, Jul. 4-6, 1994 pp.: 521-525 vol.2).*

* cited by examiner

Primary Examiner—Shuwang Liu
Assistant Examiner—Ted Wang
(74) Attorney, Agent, or Firm—Oblon, Spivak, McClelland, Maier & Neustadt, P.C.

(57) ABSTRACT

A spread spectrum receiver and method having narrow-band interference rejection of narrow-band jamming signals using digital signal processing frequency domain techniques. The method performed in the receiver includes transforming the received signal to a frequency domain signal and identifying narrow-band interference components in the frequency domain signal; suppressing the identified narrow-band interference components by excising the identified narrow-band interference components from the frequency domain signal to produce an interference excised signal in the frequency domain, and storing in a memory frequencies corresponding to the identified narrow-band interference components; synchronizing a receiver code to a transmitter code in the frequency domain using the interference excised signal; generating coefficients for a time domain filter that includes notches at the frequencies corresponding to the excised narrow-band interference components and that jointly despreads and rejects narrow-band interference from the excised frequencies; applying the coefficients generated in the preceding step to the time domain filter, and despreading and filtering in real time in the time domain the received signal using the applied coefficients.

29 Claims, 17 Drawing Sheets

M – NUMBER OF CODE PERIODS IN THE DATA RECORD
K – SAMPLES PER CHIP
L – CHIPS IN THE SPREADING CODE

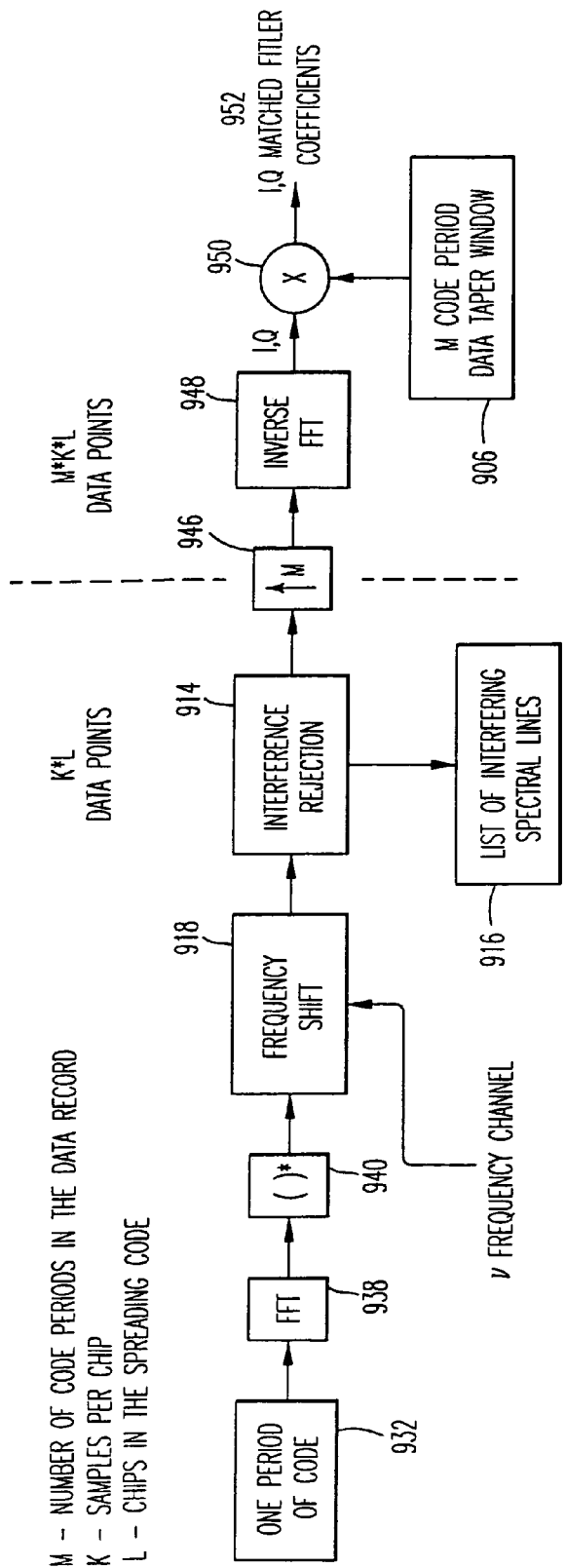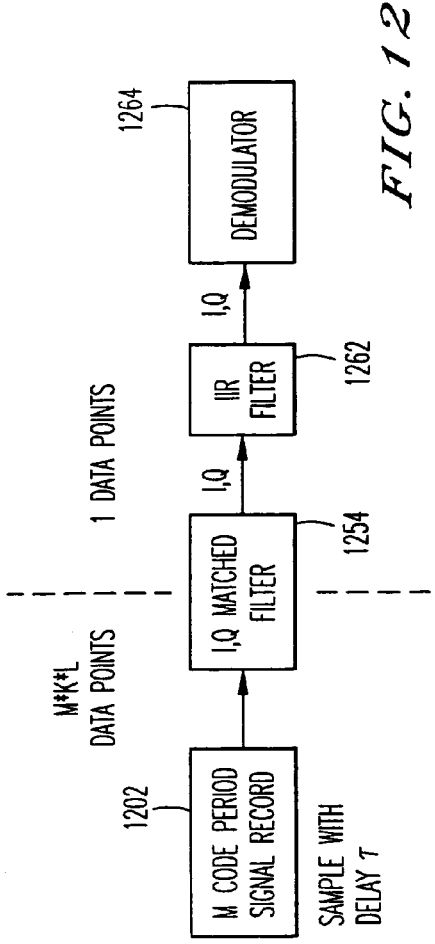
*FIG. 9*
*FIG. 12*

NARROW-BAND INTERFERENCE REJECTING SPREAD SPECTRUM RADIO SYSTEM AND METHOD

CROSS REFERENCE TO RELATED APPLICATION

This application claims benefit of priority to U.S. Provisional Patent Application No. 60-092,839 filed Jul. 14, 1998, the entire disclosure of which is incorporated by reference herein.

BACKGROUND OF THE INVENTION

1. Field of the Invention

The present invention relates to communications-related systems and methods as well as digital signal processing devices and methods. More particularly, the invention is directed to the field of spread spectrum (SS) communication that employs a SS transmitter and a SS receiver, or SS transceiver configured to convey a message in a transmitted SS signal by spectrally spreading the message signal on transmission and correlating on reception so as to "despread" the SS signal and recover the message signal.

2. Description of the Background

Conventional narrowband (i.e., non-spread spectrum) radio communication devices transmit signals in frequency bandwidths that are roughly equivalent to a message signal bandwidth (or information bandwidth). These devices typically use a radio-frequency (RF) carrier derived from a frequency reference (i.e., a device that produces a precise frequency, although the accuracy of the frequency usually depends on the cost of the device) and modulate the message onto an RF carrier. Common conventional message modulation methods such as amplitude modulation (AM), phase modulation (PM) or frequency modulation (FM) cause the RF carrier to occupy more bandwidth than the RF carrier alone, but the total bandwidth for the modulated RF carrier is relatively narrow. As such, interfering signals (e.g. jammers) that are transmitted in the same bandwidth as the modulated RF carrier can effectively "jam" the desired signal and prevent a receiver from reproducing the message signal. Aside from jamming, disturbances in the communications path between the transmitter and receiver can interfere with reception.

Spread spectrum radio communication addresses the shortcomings of narrowband radio communications by combining a wideband spreading signal with the message signal so as to spectrally spread the message signal. In these types of systems, the transmitter also modulates an RF carrier with a message, as with the narrowband systems, but then adds one more step by modulating the resulting signal with a wideband, noise-like spreading signal (e.g. a PN code). Consequently, the message signal is spread in frequency over a much larger bandwidth, typically by ten to a thousand fold. Common spread spectrum techniques include frequency hopping and direct sequence. Frequency hopping systems drive (i.e., "hop") the message modulated carrier to frequencies following a pseudo-random pattern defined by a spreading code. Direct sequence systems combine a spreading code with the message modulated carrier to create a signal which occupies about the bandwidth of the spreading signal.

Narrowband interference signals transmitted at the same frequency as a portion of the desired spread signal, "jam" the spread signal by an amount proportional to the ratio of jammer bandwidth to spread bandwidth. At most, the narrowband interfering signal is attenuated by a "process gain" of the spread spectrum system, where process gain is defined as a ratio of spread signal bandwidth to message signal bandwidth. For similar reasons, spread spectrum signals also offer some degree of immunity to multipath fading and distortions. However, in applications where a SS receiver is attempting to receive a distant SS transmitter, the process gain of the system may be insufficient to overcome the undesirable effects of a nearby narrowband jammer.

A narrow band-reject filter placed prior to the spread spectrum correlator provides narrowband interference rejection far in excess of the process gain. Applications are enabled where a distant SS transmitter is received by a SS receiver in the presence of a nearby narrowband jammer. Many techniques have been disclosed which practice the narrow band-reject filter. Some are accomplished in the frequency domain with digital signal processing (DSP). These techniques as taught require extensive computing resources and are therefor relatively expensive to implement.

In particular, J. D. Laster and J. H. Reed, ("Interference Rejection in Digital Wireless Communications," IEEE Signal Processing Magazine, May 1997) serves as a bibliography of interference rejection techniques that have been published in recent years. The techniques cover both spread spectrum and narrowband methods.

Souissi (U.S. Pat. No. 5,671,247) teaches a frequency domain technique to remove narrowband jammers from a received spread spectrum signal. Souissi converts a received signal into the frequency domain where the signal components are represented by magnitude and phase. The magnitude of all signal components are normalized, thereby reducing the effects of narrowband jammers. The resultant signal components are then converted back into the time domain for message demodulation.

Blanchard (U.S. Pat. No. 5,612,978) also teaches the use of frequency domain techniques to reject narrowband interference. Frequency bins in which narrowband energy is detected are removed. The circuit contains a delay element to account for the time required for the FFT processing. It also requires the use of noise estimation for proper operation.

The use of a prime factor FFT along with time-frequency correlation for rapid and computationally efficient spread spectrum synchronization is disclosed in patent application Ser. No. 08/929,891 and is in its entirety incorporated by reference herein.

The implementation of filter banks using a Fourier transform along with a data taper window to control spectral leakage is disclosed in "Window Choices Become Crucial in High-dynamic-Range FFT Processing" by Charles Gumas, May, 1997, Personal Engineering.

A general digital signal processing reference is "Handbook for Digital Signal Processing" by Sanjit K. Mitra and James F. Kaiser, 1993, John Wiley & Sons, Inc.

SUMMARY OF THE INVENTION

Accordingly, it is an object of the present invention to provide a new and improved spread spectrum receiver which performs narrow-band interference rejection in a received spread spectrum signal transmitted by a spread spectrum transmitter with about a twenty-four-fold decrease in the computing resources required to achieve comparable narrowband interference rejection.

Another object of this invention is to provide a novel spread spectrum receiver and method which rejects narrow-band interference during spreading code synchronization and message demodulation.

A further object of this invention is to provide a novel spread spectrum receiver and method which provides relatively rapid spreading code synchronization.

Yet another object of this invention is to provide a novel spread spectrum receiver and method which provides full process gain and receive sensitivity with relatively low accuracy frequency sources in a transmitter and a receiver.

Another object of this invention is to provide a novel spread spectrum receiver and method which is computationally efficient when practiced on a digital signal processor, i.e., requires relatively a reduced amount of hardware and/or software.

Still a further object of this invention is to provide a novel spread spectrum receiver and method which may band-limit the received signal to reject out of band interference and/or which also may downconvert the received signal from a near-baseband intermediate frequency (IF) to baseband.

This and other objects are achieved according to the present invention by providing a new and improved spread spectrum radio receiver and method for narrow-band interference rejection in a received signal transmitted by a spread spectrum transmitter, including transforming the received signal to a frequency domain signal and identifying narrow-band interference components in the frequency domain signal; suppressing the identified narrow-band interference components by excising the identified narrow-band interference components from the frequency domain signal to produce an interference excised signal in the frequency domain, and storing in a memory frequencies corresponding to the identified narrow-band interference components; synchronizing a receiver code to a transmitter code in the frequency domain using the interference excised signal; generating coefficients for a time domain filter that includes notches at the frequencies corresponding to the excised narrow-band interference components and that jointly despreads and rejects narrow-band interference from said excised frequencies; applying the coefficients generated in the preceding step to the time domain filter; and despreading and filtering in real time in the time domain the received signal using the applied coefficients.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8 through 11 are diagrams of frequency domain to time domain conversion methods that reject narrow-band interference in a spread spectrum radio receiver.

FIG. 12 is a diagram of a time domain despreading method that rejects narrow-band interference in a spread spectrum radio receiver.

DETAILED DESCRIPTION OF THE PREFERRED EMBODIMENTS

Figure 1A:
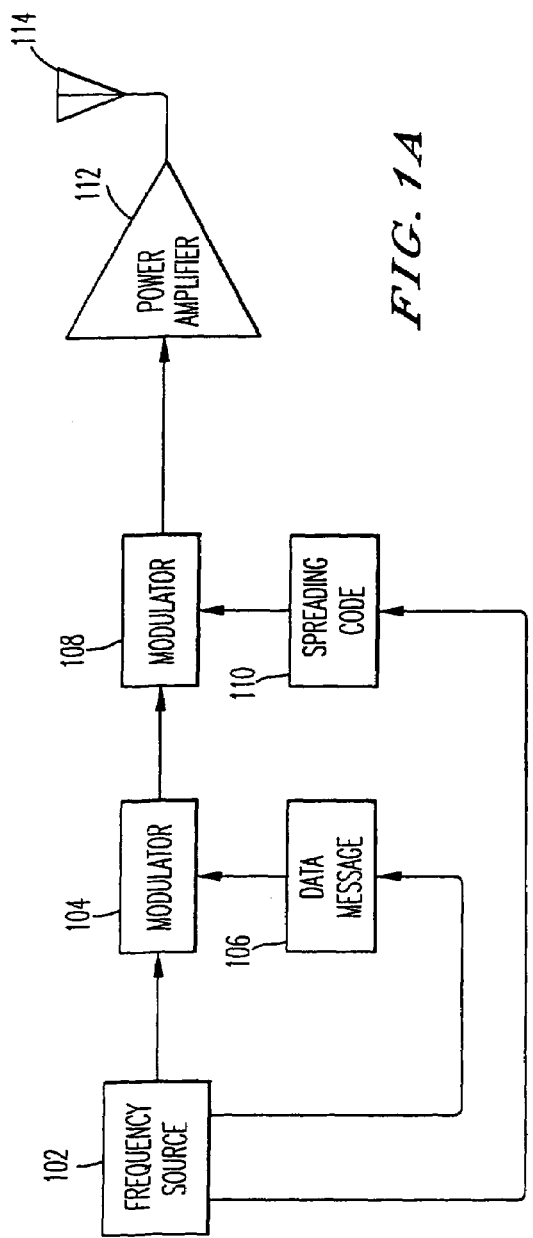
FIGS. 1A and 1B are diagrams of a spread spectrum radio transmitting and receiving system that rejects narrow-band interference.

Referring now to the drawings, wherein the two least significant digits of reference numeral designations designate identical or corresponding parts throughout the several views and the third and fourth significant digits of the reference numeral designations refer to the respective drawing number, the present invention is next described.

The present invention resolves both frequency difference between a receiver and a transmitter and the spreading code delay (time difference) between a receiver and a transmitter. A transmitter is shown in FIG. 1A where a carrier wave generated by a frequency source 102 is modulated 104 by a message 106. The resultant signal is then modulated 108 by a spreading code 110 to achieve the benefits of spread spectrum communications. This signal is then amplified at amplifier 112 prior to transmission via antenna 114. Frequency source 102 will generate the carrier wave as well as control the timing of both the message 106 and the timing of the spreading code generator 110. The spread spectrum transmitter that works in conjunction with the receiver in the preferred embodiment of the present invention has a crystal controlled frequency source. This invention enables an inexpensive transmitter frequency source having an accuracy of ±50 parts per million (ppm) in the preferred embodiment.

Figure 1B:
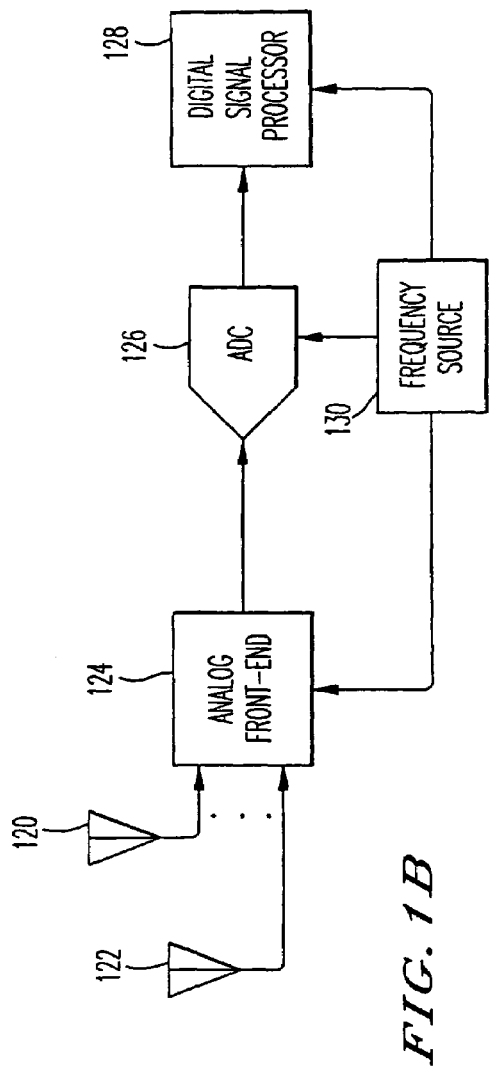

The receiver of the present invention is shown in FIG. 1B where diversity antennas 120 and 122 (and, alternately, additional antennas) provide an RF signal to analog front-end 124. This front end may convert the RF signal either to an intermediate frequency (IF) signal or directly to baseband. The downconverted signal is digitized at the analog to digital converter (ADC) 126. The digitized signal is sent to the digital signal processing (DSP) section 128. Frequency source 130 provides one or more downconversion frequencies to the analog front end 124, a sampling clock to ADC 126, and a processor clock to DSP 128. The receiver in the preferred embodiment of the present invention has a crystal controlled frequency source with an accuracy of ±15 ppm. The total system frequency error is the sum of the errors from both the transmitter and the receiver. The overall frequency accuracy of the system in the preferred embodiment is about ±65 ppm. In the preferred embodiment, the center frequency of the transmitted signal is about 915 MHz. The receiver must be able to resolve a signal with about ±60 kHz of frequency error.

The present invention is not dependent on a particular method of message (information) modulation. The in-phase (I) and quadrature (Q) values of the message symbols in the following disclosure may represent any analog (AM, PM, FM or other) or digital (ASK, PSK, FSK, QAM or other) information modulation method.

The present invention is directed to the digital signal processing portion of a spread spectrum receiver. Several different analog front-end 124 configurations may exist which affect different aspects of the digital signal processor (DSP) 128. One must consider whether the front end translates the signal directly to baseband, or allows the signal to remain in a near-baseband IF configuration prior to the analog-to-digital conversion (ADC). If the signal is digitized at baseband, the I (real part) and Q (imaginary part) are fed to a complex input FFT (Fast Fourier Transform) in the following disclosure. If the signal is digitized at IF, it is fed to a real input FFT and the frequency shift blocks include a term equal to the IF in the following disclosure. This downconverts the received signal from a near-baseband IF to baseband.

Any digital signal processing apparatus such as a digital signal processor (DSP) integrated circuit (IC), a general purpose micro-controller ($\mu$C) IC, general purpose digital logic, or a custom digital IC or any combination of these can execute the disclosed methods. A DSP or $\mu$C executes the method as a stored program (software). General purpose digital logic or a custom digital IC execute the method by circuit arrangement (hardware).

Figure 2:
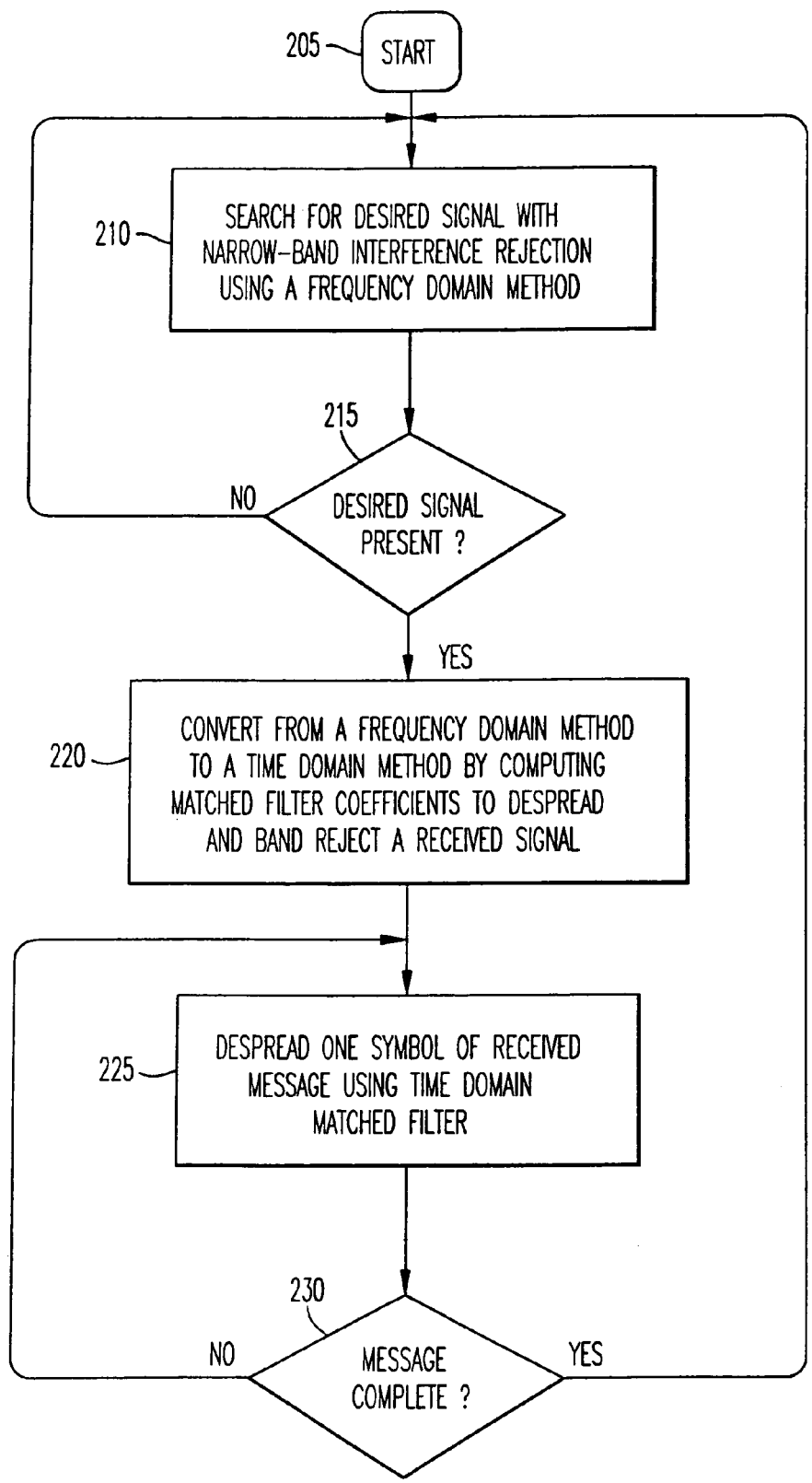
FIGS. 2, 13 and 14 are diagrams of synchronization and demodulation methods that reject narrow-band interference in a spread spectrum radio receiver.

It is most computationally efficient to perform code synchronization in the frequency domain and to perform demodulation in the time domain. This is the preferred embodiment of the present invention. The method of the present invention is shown in FIG. 2 where the process starts at block 205. There a desired signal search is performed in block 210 where a frequency domain method performs narrow-band interference rejection. Decision block 215 determines whether or not a desired signal has been detected (synchronization has occurred), and returns to block 210 if no signal is present. Once a desired signal has been detected, the process proceeds to block 220 where matched filter coefficients are computed that both 1) despread the desired spread spectrum signal and 2) reject narrowband jammers (interference) by including a notch in the filter frequency response for each jammer. The method then proceeds to the time domain where blocks 225 and 230 despread and demodulate the received message using matched filters calculated in block 220. The demodulation process continues until the message is complete. Once the message is completed, search mode resumes at block 210 using the frequency domain method. The matched filter computations of block 225 are less than one-sixth of the computations of the FFT alone of block 210. This method thus minimizes overall computation compared to prior art. The prior art computes an FFT and an inverse FFT for each demodulated message bit. The narrowband interference remains stationary over the message duration for this technique to be maximally effective. This technique detects narrowband (NB) interference only once, at the beginning of a message. If a new NB jammer begins transmitting after the start of the message, this technique does not remove the new NB jammer. Likewise, if an existing NB jammer stops transmitting after the start of the message, this technique will unnecessarily attenuate the desired signal of interest. An environment with dynamic NB jammer characteristics will be better handled by techniques disclosed further on.

The method 210 for synchronization is further explained in FIG. 3 as follows. A digitally sampled signal record 302 of M spreading code periods is multiplied 304 by a data taper window 306, also of M spreading code periods. The data taper window suppresses spectral leakage of narrowband interference. (See Gumas as cited above.) The signal record 302 is sampled at K samples per code chip. The spreading code is L chips in duration. Blocks 302 and 306 both have (M*K*L) data points. This computational loading is carried throughout the process. In the preferred embodiment of the present invention, M=3, K=4, and L=63. The output of multiplier 304 is converted into the frequency domain by a Fast Fourier Transform (FT) 308. Because the input record length is not a power of 2, the prime factor FFT is used as disclosed in the above cross-referenced U.S. patent application Ser. No. 08/929,891. The frequency of any narrowband jammers is determined and they are excised (magnitude set to zero) in block 314. The frequencies of the excised spectral lines (if any) are recorded in block 316. A time-frequency correlation process 320 is performed, followed by a synchronization (desired signal present) process 322. The result of the synchronization process is a code delay $\tau$ 326 and a frequency error $v$ 328 (transmitter-receiver frequency difference, i.e., a frequency channel). Steps 308, 320, and 322 are disclosed in patent application Ser. No. 08/929,891 as cited above.

Figure 3:
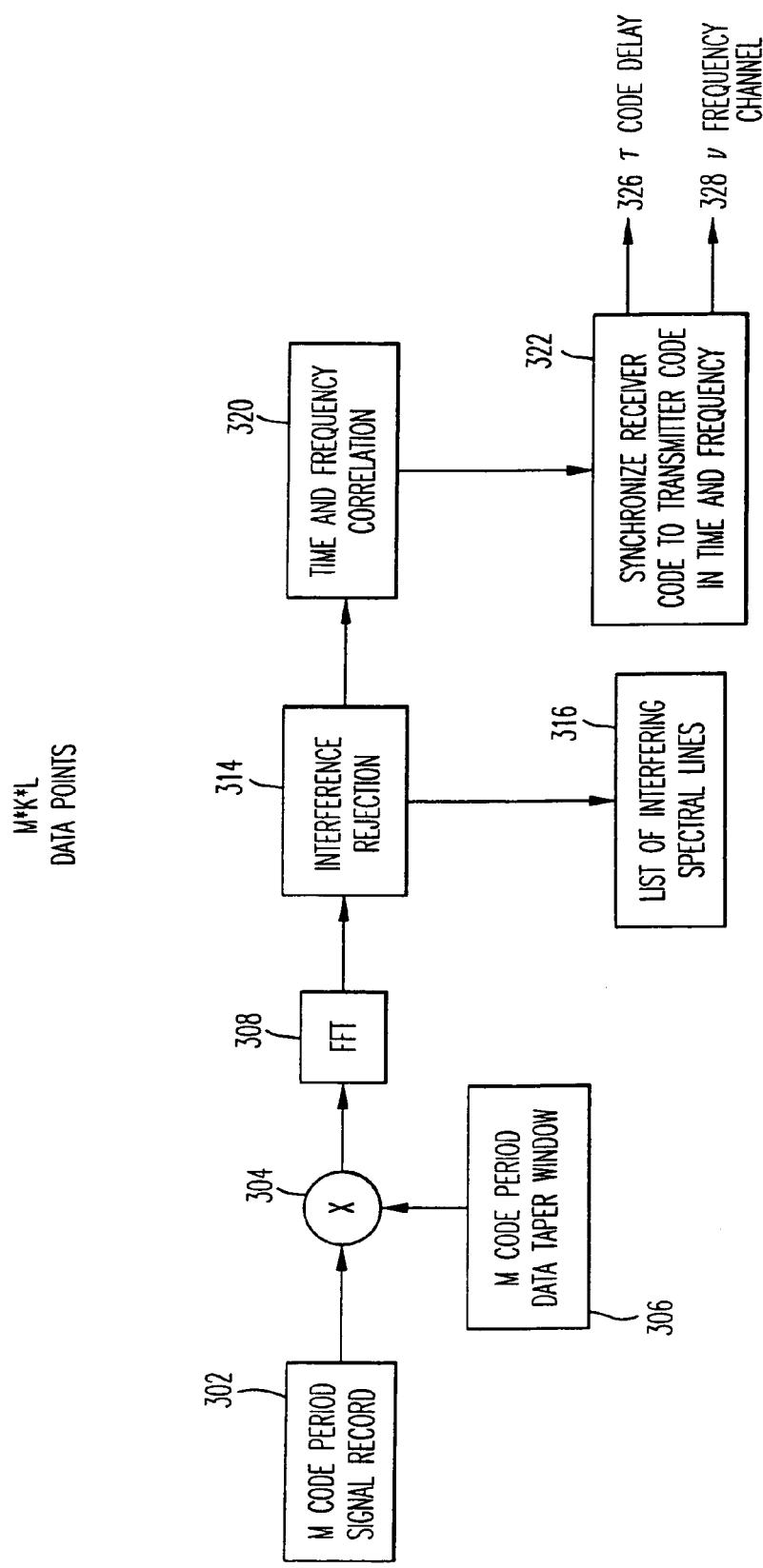
FIGS. 3, 5, 6 and 7 are diagrams of frequency domain synchronization methods that reject narrow-band interference in a spread spectrum radio receiver.
Figure 4:
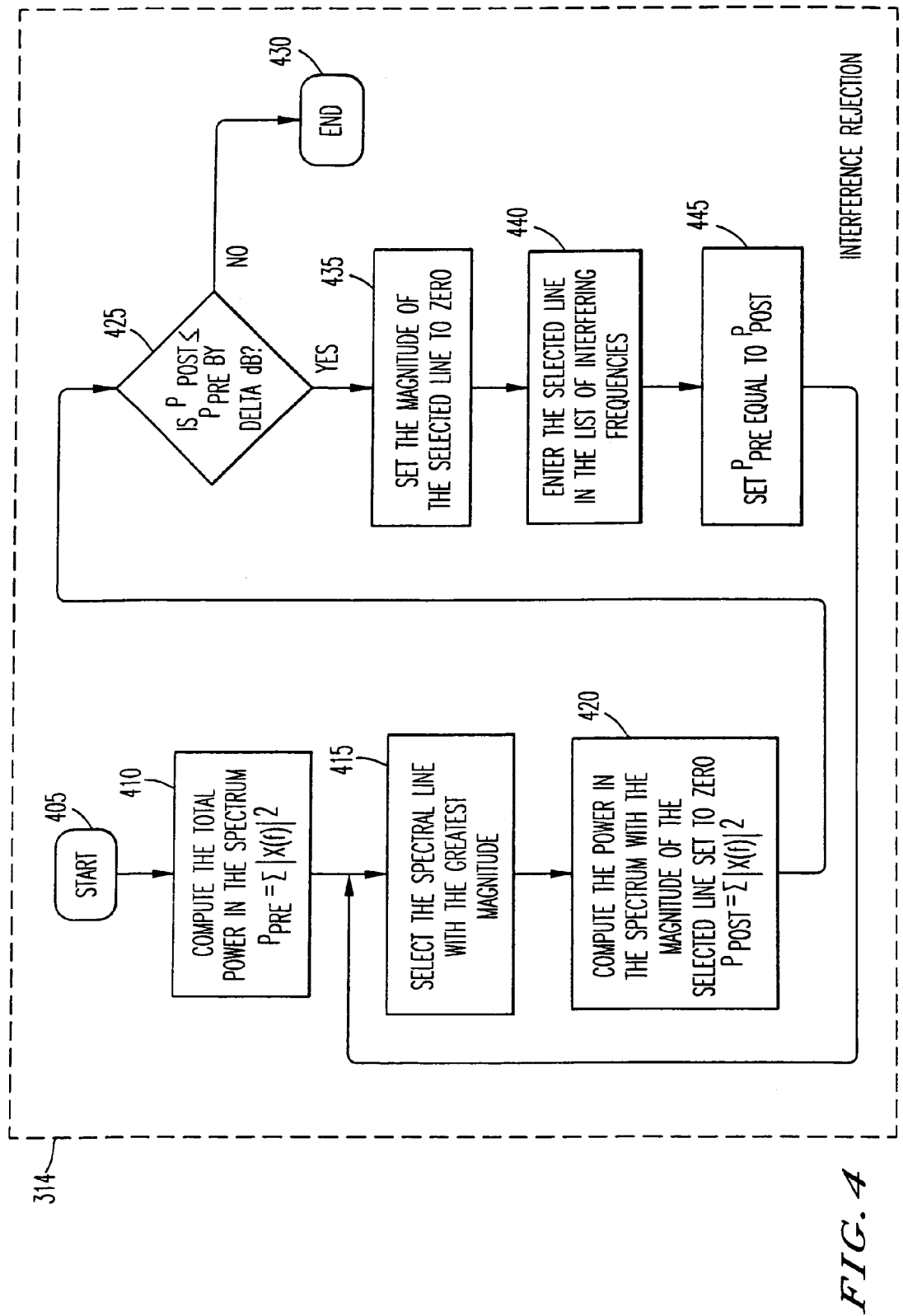
FIG. 4 is a diagram of a frequency domain narrow-band interference rejection method in a spread spectrum radio receiver.

The method 314 for interference rejection is further explained in FIG. 4 where the process begins in block 405. An initial signal power in all frequency bins is computed in block 410 prior to block 415 where the spectral line with the largest magnitude is selected. Block 420 then computes a second signal power in all frequency bins with the selected line removed from the power computation. The process proceeds to decision block 425 which computes the difference between the two power calculations. If the difference is less than a predetermined amount delta between the two power calculations, then it is determined that the removed spectral line (from step 415) is from a desired spread spectrum signal, and the process exits through block 430. In the preferred embodiment of the present invention, this delta value is equal to 0.4 dB. A skilled artisan appreciates that a system with a different configuration (other configurations are disclosed hereinafter) requires a different value for delta. However, if the difference between the two power calculations is greater than the predetermined delta value, then it is determined that the removed spectral line is from a narrowband jammer. This is due to the fact that a NB jammer will appear with its energy concentrated in one or a few spectral lines. In contrast, the desired signal will appear with its energy divided among all spectral lines. The spectral line is excised (magnitude set to zero) in block 435, and then block 440 enters this spectral line into a list of spectral lines that are to be removed by subsequent operations. Block 445 re-labels the power calculation from block 420 as the initial signal power value, and then returns process flow to block 415. This process continues until the condition in block 425 is satisfied and spectral lines from narrow band jammers are excised and listed. These excised lines are recorded in step 316 of FIG. 3. This is the preferred embodiment of block 314.

One skilled in the art recognizes that there are alternate means for identifying and suppressing a narrowband jammer in the received signal spectrum. The prior art discloses setting the magnitude of all spectral lines to one thereby retaining only the phase information of the received signal. This suppresses a narrowband interference with a frequency domain limiter. A modified approach discards the magnitude information and replaces it with a normalized magnitude of the desired signal. The method 314 of FIG. 3, which is the preferred embodiment of the present invention, produces a higher desired signal to jammer ratio than prior art methods by discarding all of the jammer energy.

Figure 5:
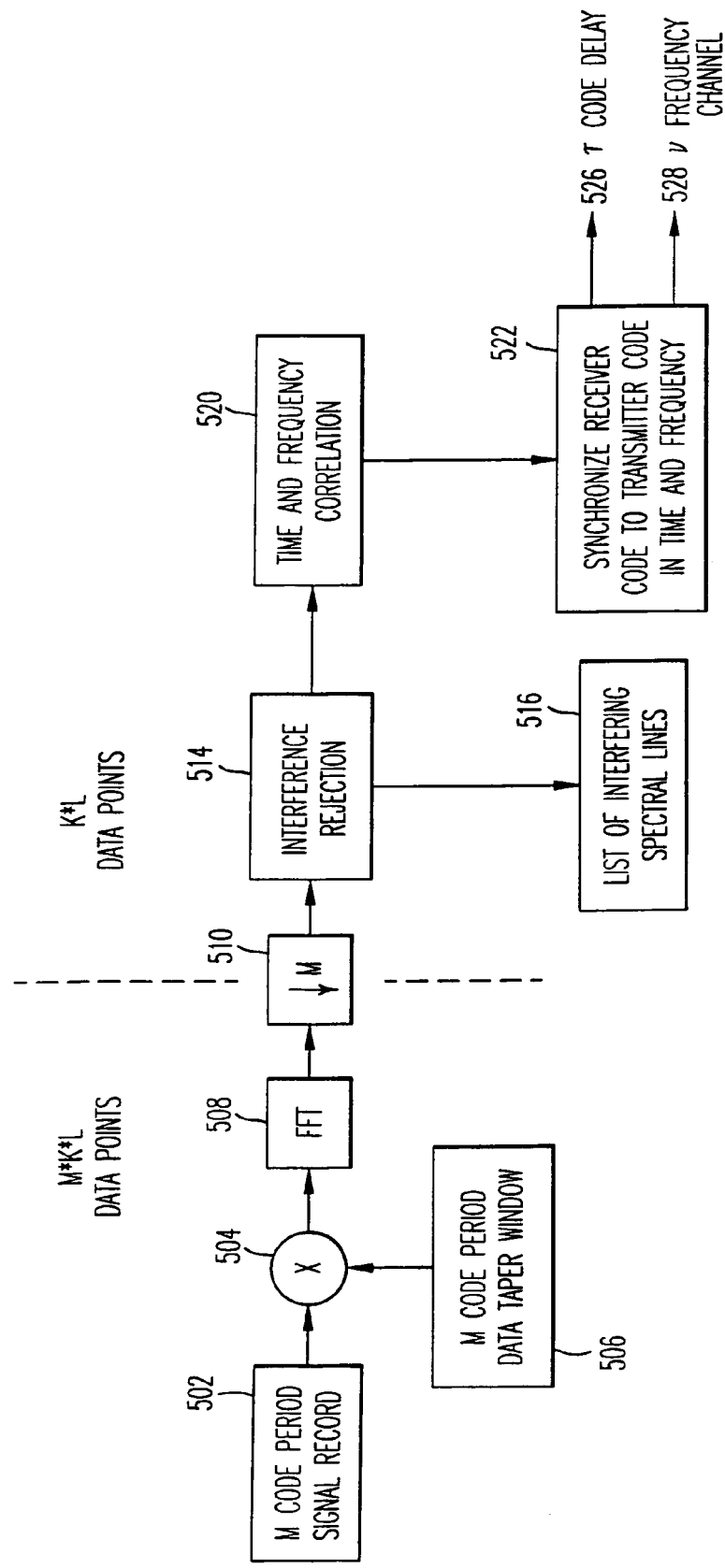

The steps in FIG. 3 represent the minimum number of steps in a narrow-band interference rejecting synchronizer of the present invention. Additional steps are available to decrease computational loading of the DSP device. The first of these steps is shown in block 510 of FIG. 5. This downsampling step reduces the computational load on the DSP by a factor of M, the number of code periods in the data record. M is equal to 3 in the preferred embodiment of the present invention. Also, the data taper window is a member of the three frequency term window family of which the Blackman window is an example. One skilled in the art recognizes that M can take on the value of one, two, or more. A message preamble of constant symbols for receiver synchronization followed by message information symbols is transmitted in the preferred embodiment of the present invention. This downsampling step does not degrade the desired signal energy of the message preamble because the signal energy of constant symbols is zero in the cast off samples.

Figure 6:
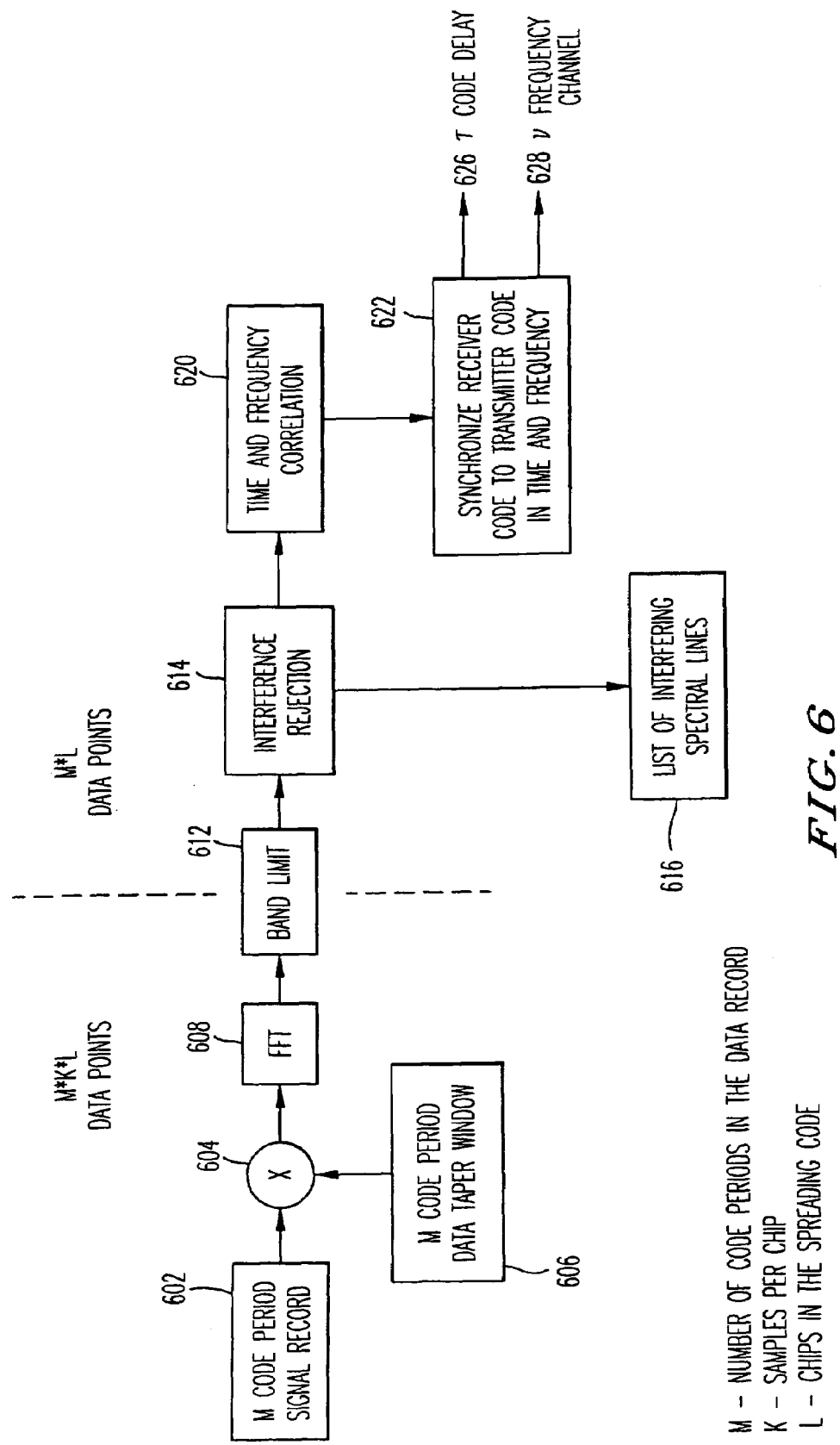

Alternately, a band-limiting step 612 is shown in FIG. 6 that retains only the center 1/K data points of the desired signal frequency spectrum. This reduces the computational load on the DSP device by a factor of K. K is equal to 4 in the preferred embodiment of the present invention. One skilled in the art recognizes that K can take on the value of one, two, or more. This band-limiting step does not degrade the desired signal energy if the corresponding transmitter is similarly band-limited.

Figure 7:
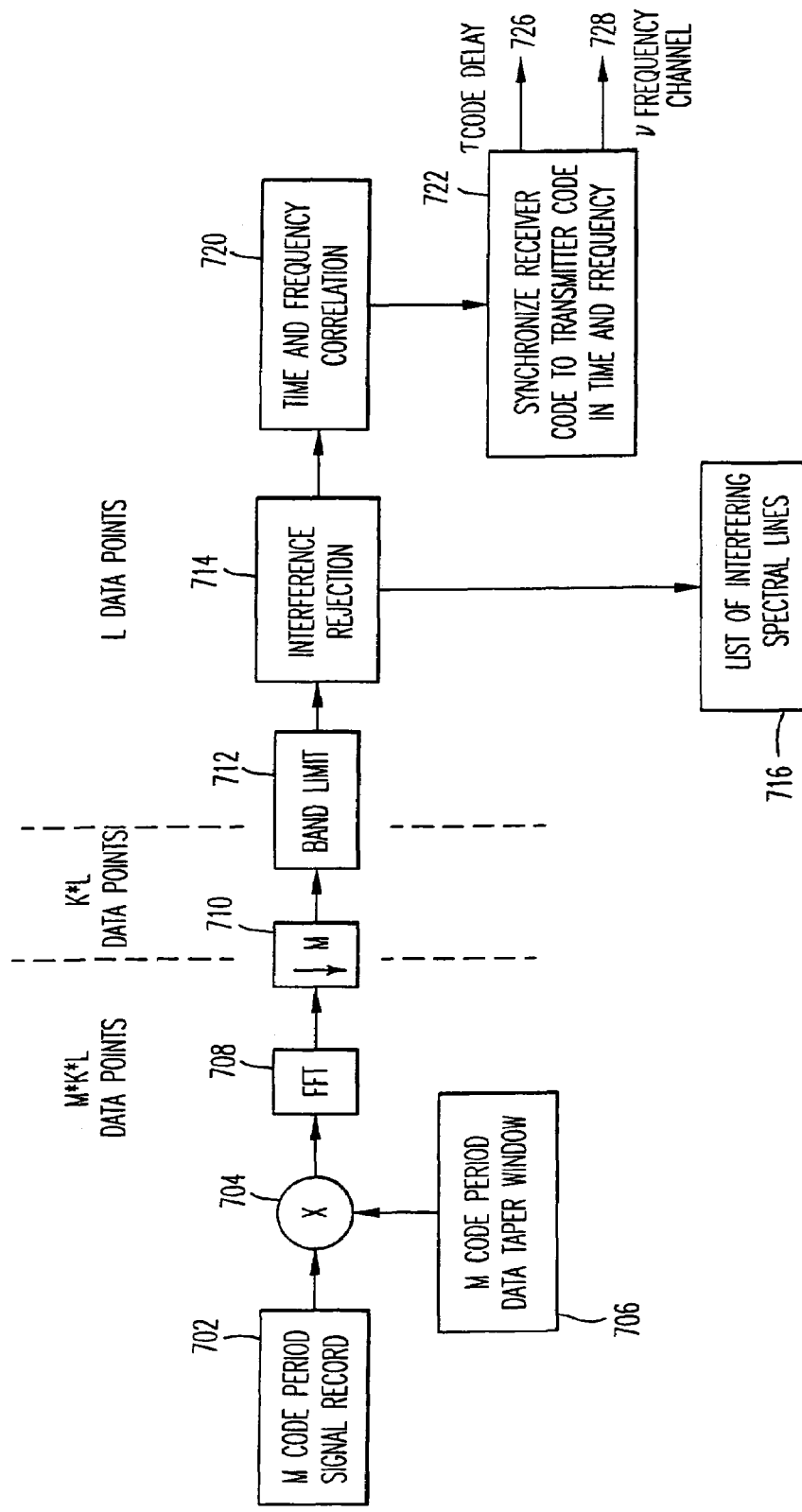

The preferred embodiment of the present invention is shown in FIG. 7. It contains all of the aforementioned techniques to reduce computational loading. The preferred embodiment includes the downsampler 710 and the band-limiting block 712 to reduce the computational loading from (M*K*L) to L. L is the number of chips in the spreading code, which represents the minimum number of data points necessary to calculate a full process gain code delay correlation in a spread spectrum receiver. The order of blocks 710 and 712 is interchangeable.

One result of the methods in FIGS. 3 through 7 is to determine signal detection (desired signal present) and a synchronization condition. According to the present invention, an additional result of the process from FIGS. 3 through 7 is a list of spectral lines that were the result of narrowband jammers (interference). This list, which is stored in memory, is used to generate a set of I/Q matched filter coefficients that will jointly 1) reject the detected narrowband interference, 2) despread the received spread spectrum signal, and alternately 3) downconvert the signal from a near-baseband signal to baseband, 4) band limit the signal, and 5) channelize (remove the transmitter/receiver frequency error) the signal.

Figure 8:
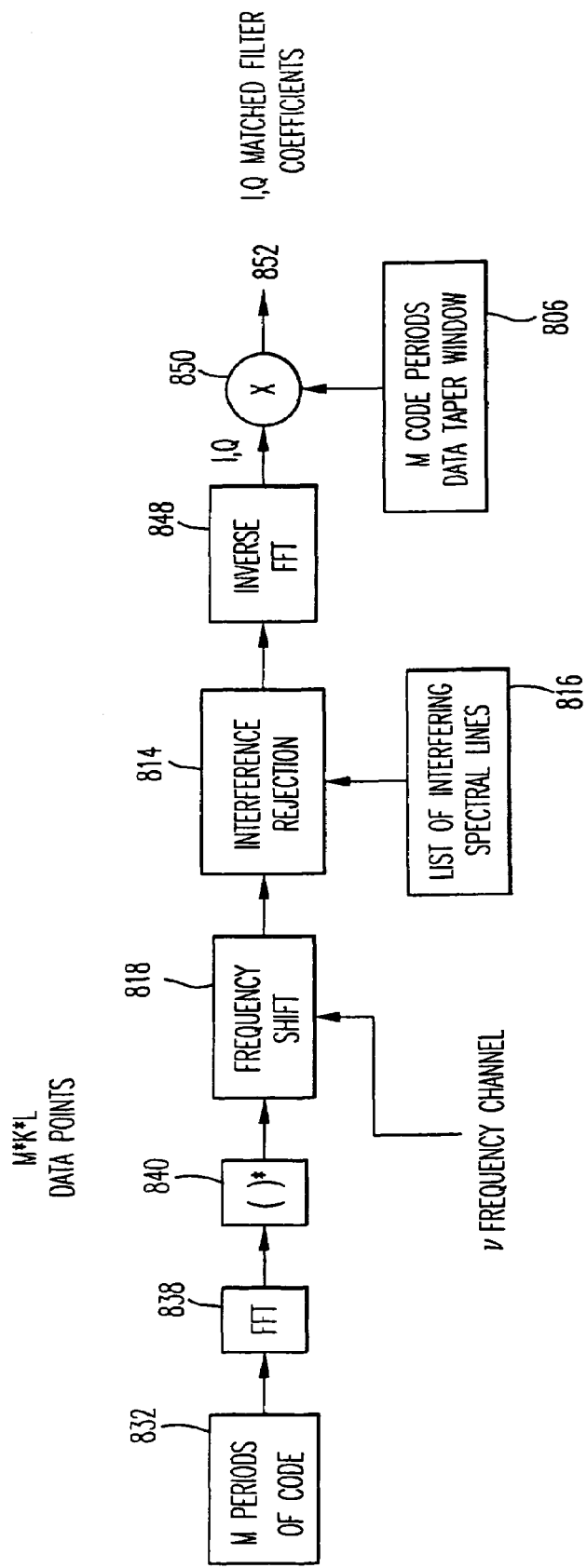

The method 220 for generating the I/Q matched filter coefficients is explained in FIG. 8. M periods of the spreading code digitized at K samples per chip 832 are converted into the frequency domain by FFT block 838. Block 840 performs a complex conjugate operation on the output of block 838. The frequency error v 328 is used by the frequency shift block 818 to frequency shift the output of complex conjugate block 840. This is a data indexing process and does not add computational complexity to the signal processing method. In the most elementary receivers frequency error removal is not performed. The spectral lines from block 816 are excised by setting the magnitude to zero in block 814. The interference rejection block 814 uses the list of spectral lines from block 816. The list of interfering lines 816 corresponds to block 316 of FIG. 3. Inverse FFT block 848 converts this data set into the time domain. The complex output inverse FFT produces I (real part) and Q (complex part) sequences. The resulting signal is combined with data taper window 806 (similar to the data taper window 306 from FIG. 3) in multiplier 850. The result is the set of I/Q filter coefficients 852. These coefficients are uniquely generated each time the receiver locks onto a desired spread spectrum signal. Step 838 is disclosed in patent application Ser. No. 08/929,891 above cross-referenced.

The steps in FIG. 8 represent the minimum number of steps required to calculate the matched filter I/Q coefficients. Additional steps may be added to increase the computational efficiency of the DSP device. FIG. 9 requires only one period of the spreading code 932, but adds the up-sampling step 946 to replicate M code periods in the matched filter coefficients. (The upsampling by a factor of M adds M-1 zeroes between the existing data points.) The list of interfering lines 916 corresponds to block 516 of FIG. 5.

Figure 10:
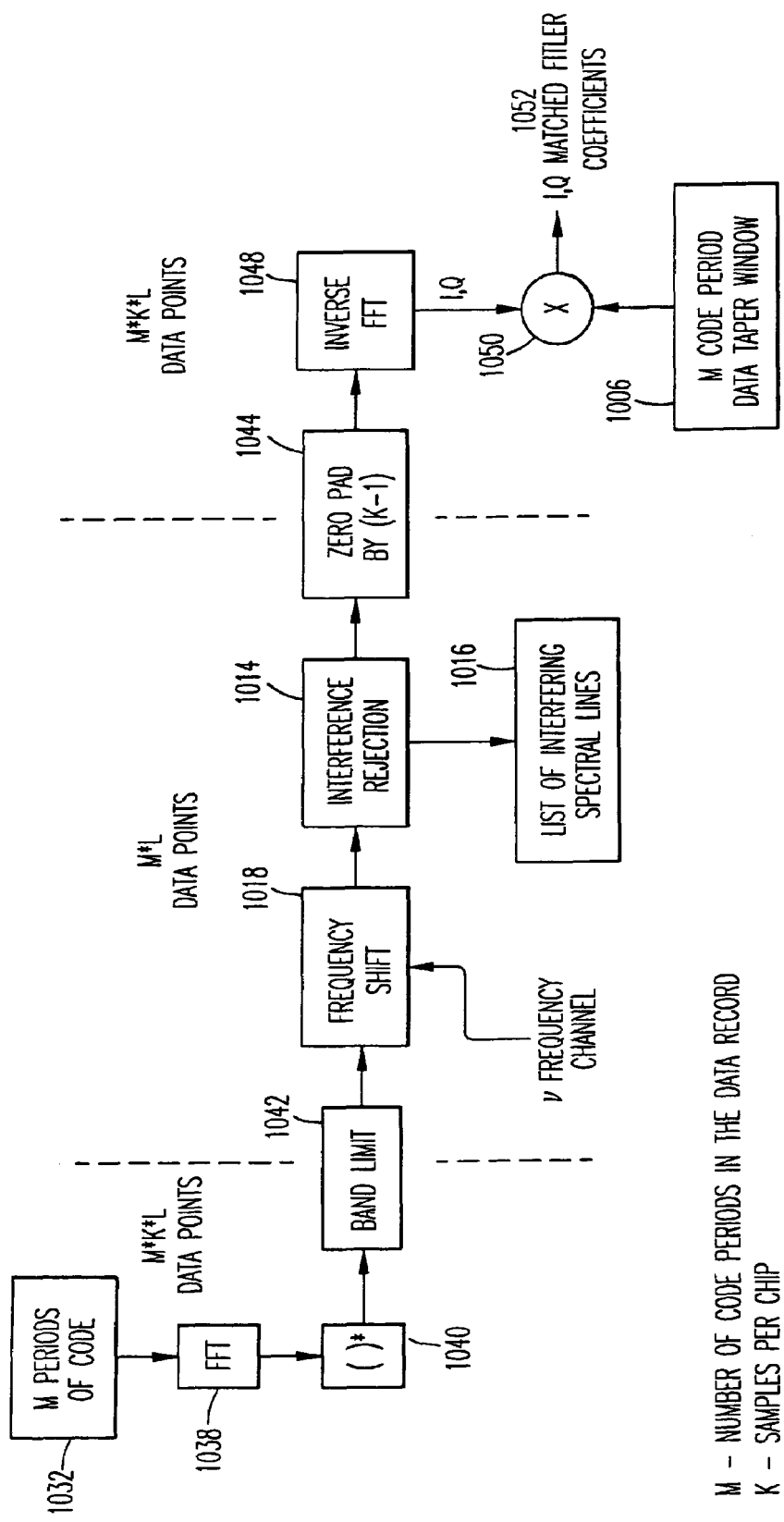

FIG. 10 requires M periods of the spreading code 1032. In FIG. 10, the band-limiting step 1042 and zero pad step 1044 are added to reduce the computational loading of the center part of the method. The zero pad function block 1044 appends [(K−1)*L] zero values beyond the Nyquist frequency of the data points from 1014 to bring the number of data points up to (M*K*L). This produces an ideal band-limited reference code at K samples per code chip. The list of interfering lines 1016 corresponds to block 616 of FIG. 6.

Figure 11:
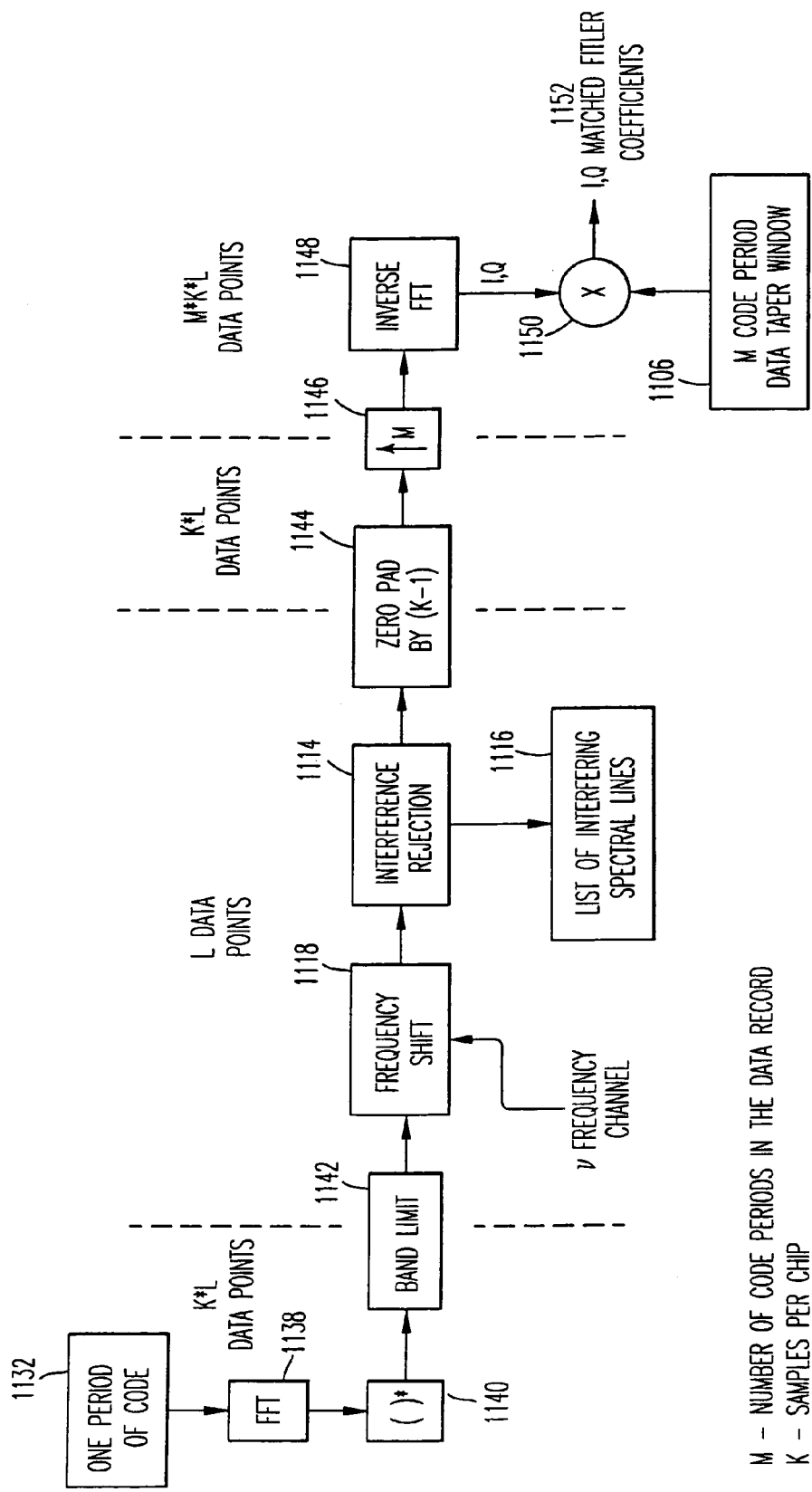

The preferred embodiment of the present invention is depicted in FIG. 11. This Figure shows one period of the spreading code in block 1132, a band-limiting step 1142, a zero pad step 1144, and an up-sampling step 1146. This provides highest computational efficiency. The list of interfering lines 1116 corresponds to block 716 of FIG. 7. The order of blocks 1144 and 1146 is interchangeable.

The method 225 for message demodulation is explained in FIG. 12. Block 1202 shows a signal record of M code periods in length. This signal record is obtained similarly to block 302 from FIG. 3. It is sampled at delay τ 326 as determined by the synchronization method to align the transmitter and receiver codes in time. The in-phase and quadrature (I and Q) portions of the message signal are extracted by matched filter 1254. The matched filter coefficients are the output 852, 952, 1052 or 1152 of FIG. 8, 9, 10 or 11 respectively. The frequency response of the matched filter includes a notch for each jammer. The output of block 1254 contains information from M code periods of the message. IIR filter 1262 removes the inter-symbol interference (symbol-smearing effect) and extracts the present message symbol I and Q values for demodulator block 1264.

Figure 13:
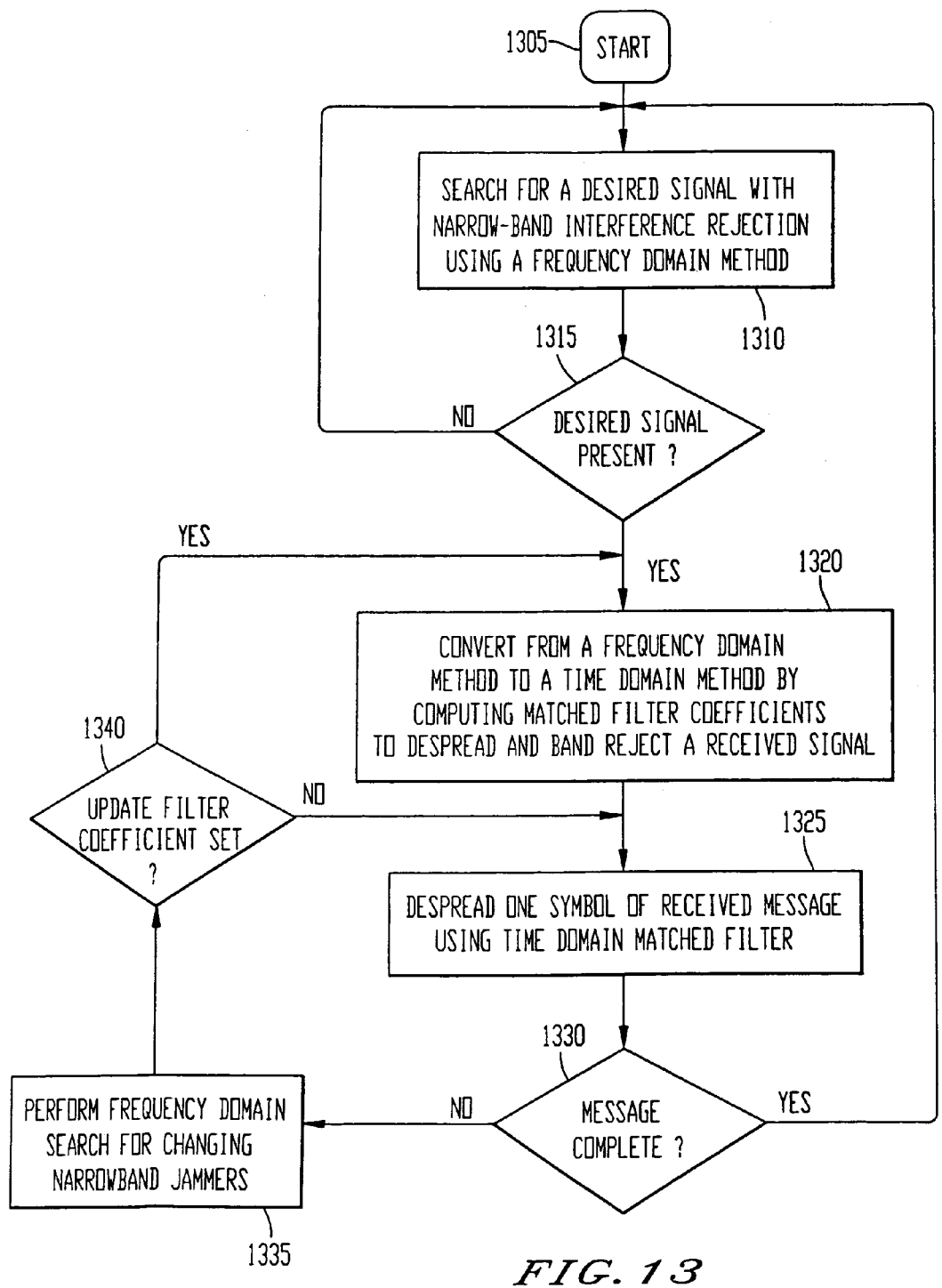

An alternative to the method of FIG. 2 is shown in FIG. 13. The method of FIG. 2 maintains the same set of matched coefficients throughout the lifetime of the message. However, in dynamic environments, narrowband jammers can appear and disappear more often. This may be due to pulsed narrowband transmitters or a slow frequency hopping transmitter residing in the same frequency band as the spread spectrum receiver. To adapt to a dynamic jamming environment, steps 1335 and 1340 are added to the method of FIG. 2. Block 1335 performs a frequency domain search for narrowband jammers. The method of block 1335 is explained by the block diagram of FIG. 3. Note that since the receiver has already achieved a synchronization condition, blocks 320 and 322 are not executed as part of block 1335. The list of interfering spectral lines 316 is the only output of interest from the execution of block 1335. This list is used to update the matched filter coefficients. Depending on the configuration of the receiver, block 1335 may operate in parallel with the demodulation block 1325. Decision block 1340 tests whether or not the jammer rejection list has been completed. If a new jammer rejection list has been completed, then the process proceeds to block 1320; otherwise, the process proceeds to block 1325. Block 1335 has corresponding explanations in the block diagrams of FIGS. 5, 6, and 7.

Figure 14:
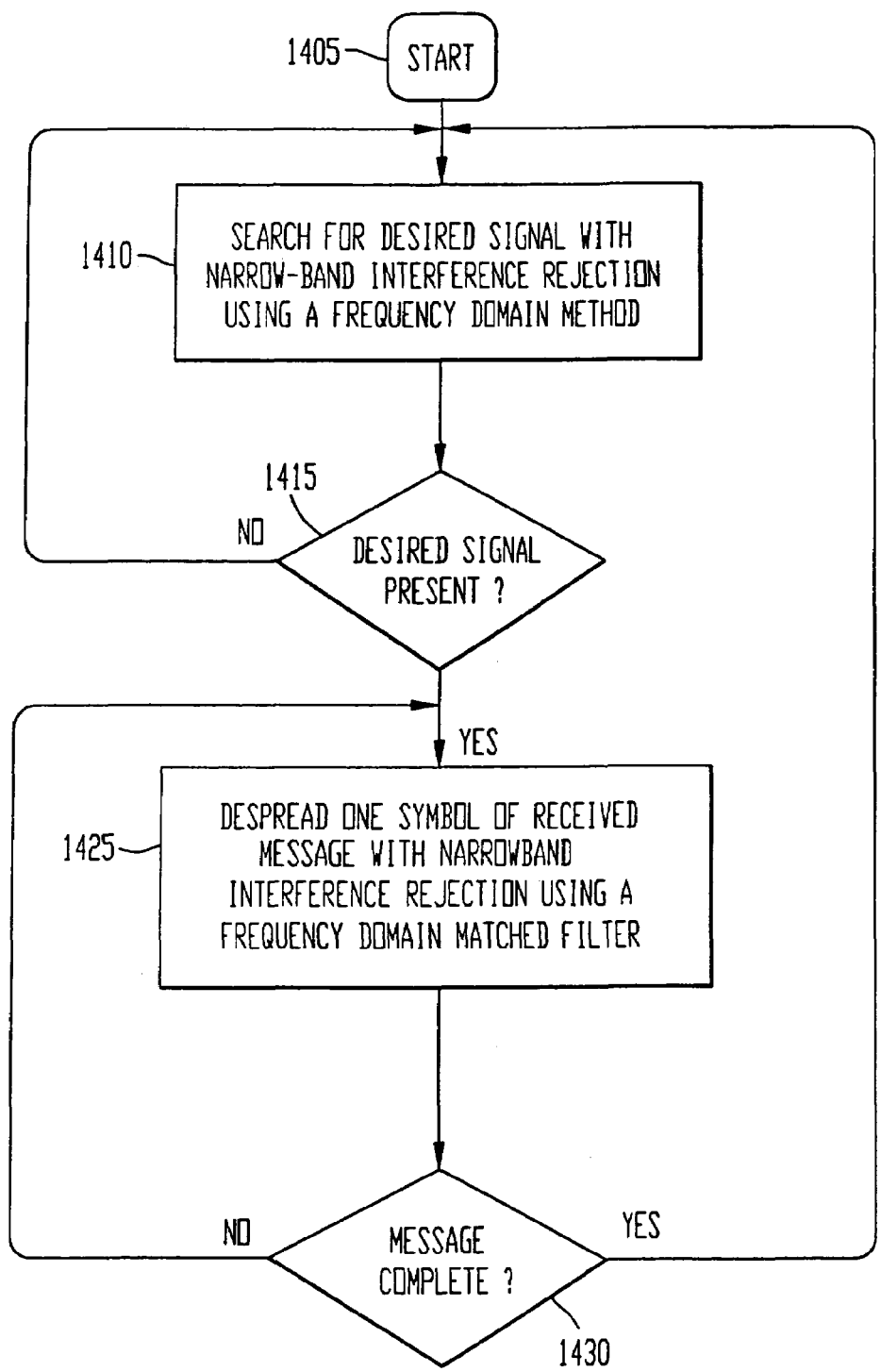

The method of FIG. 14 may be required in highly dynamic environments. If it is necessary to update the interfering spectral line list every message symbol, the most computationally efficient approach is depicted in FIG. 14 where the entire process takes place in the frequency domain. The process starts in block 1405 and then proceeds to block 1410 where a frequency domain method as disclosed above (210) performs signal acquisition with narrowband interference rejection. Decision block 1415 determines whether or not a desired signal has been detected, and returns to block 1410 if no signal is present. Once a desired signal has been detected, the process proceeds to block 1425 where a frequency domain method is executed that both 1) despreads the desired spread spectrum signal and 2) rejects narrowband jammers (interference) by excising the jammer spectral lines. Block 1425 then demodulates the message symbol. If the message is not complete, decision block 1430 proceeds to block 1425 to 1) identify and excise narrowband jammers, 2) matched filter despread, and 3) demodulate another message symbol. If the message is complete, block 1430 proceeds to block 1410 to resume search mode.

Figure 15:
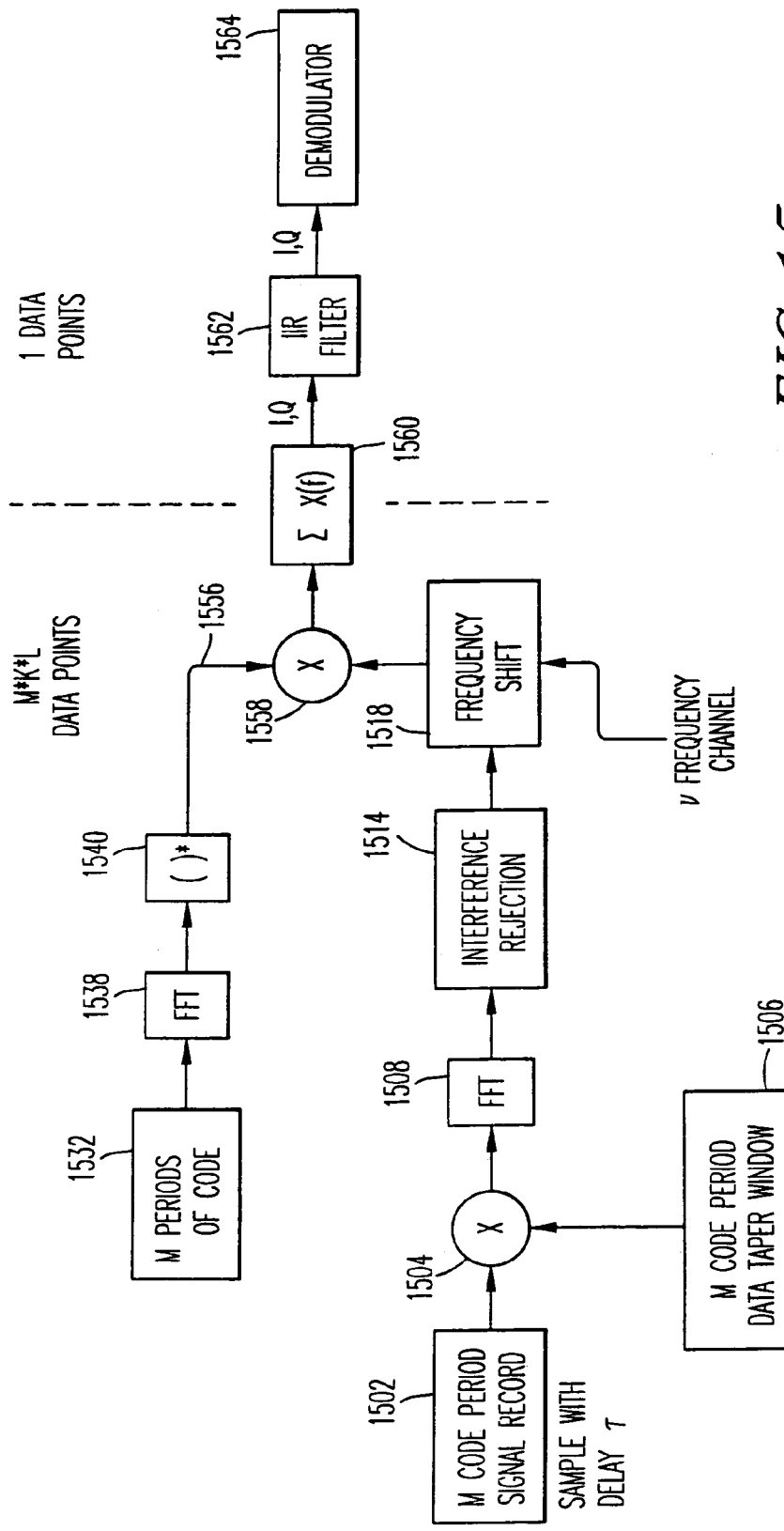
FIGS. 15 through 18 are diagrams of frequency domain despreading methods that reject narrow-band interference in a spread spectrum radio receiver.

The method 1425 of FIG. 14 is explained in FIG. 15. In block 1532, M periods of the spreading code are applied to FFT 1538 and then to complex conjugate block 1540, to produce the reference code signal 1556. This reference code can be pre-computed and stored in memory to alleviate the real-time computing resources of the DSP device. The input signal record of M code periods 1502 is multiplied 1504 by a data taper window of length M code periods 1506. The result is converted into the frequency domain by FFT 1508 and then the narrowband jammers are removed in block 1514 similarly to block 314 of FIG. 3. Block 1518 performs a frequency shift.

The reference code 1556, consisting of M periods of code, is multiplied 1558 by the M periods of interference excised data (output of block 1518). This signal is then summed in 1560 producing the I (in-phase) and Q (quadrature) message symbol components.

In the prior art, block 1560 is replaced by an inverse FFT. One output point of the prior art inverse FFT is the despread desired signal. By sampling the received signal at delay τ as in block 1502, the despread signal appears in the center output point of the prior art inverse FFT. The center point of an inverse FFT is the average of the input points. A summation of the input points is shown in block 1560 (a summation is a scaled average). This replaces the prior art inverse FFT with a simpler computation. The output of block 1560 contains information from M code periods of the message. IIR filter 1562 removes the inter-symbol interference (symbol-smearing effect) and extracts the present message symbol I and Q values for demodulator block 1564.

Figure 16:
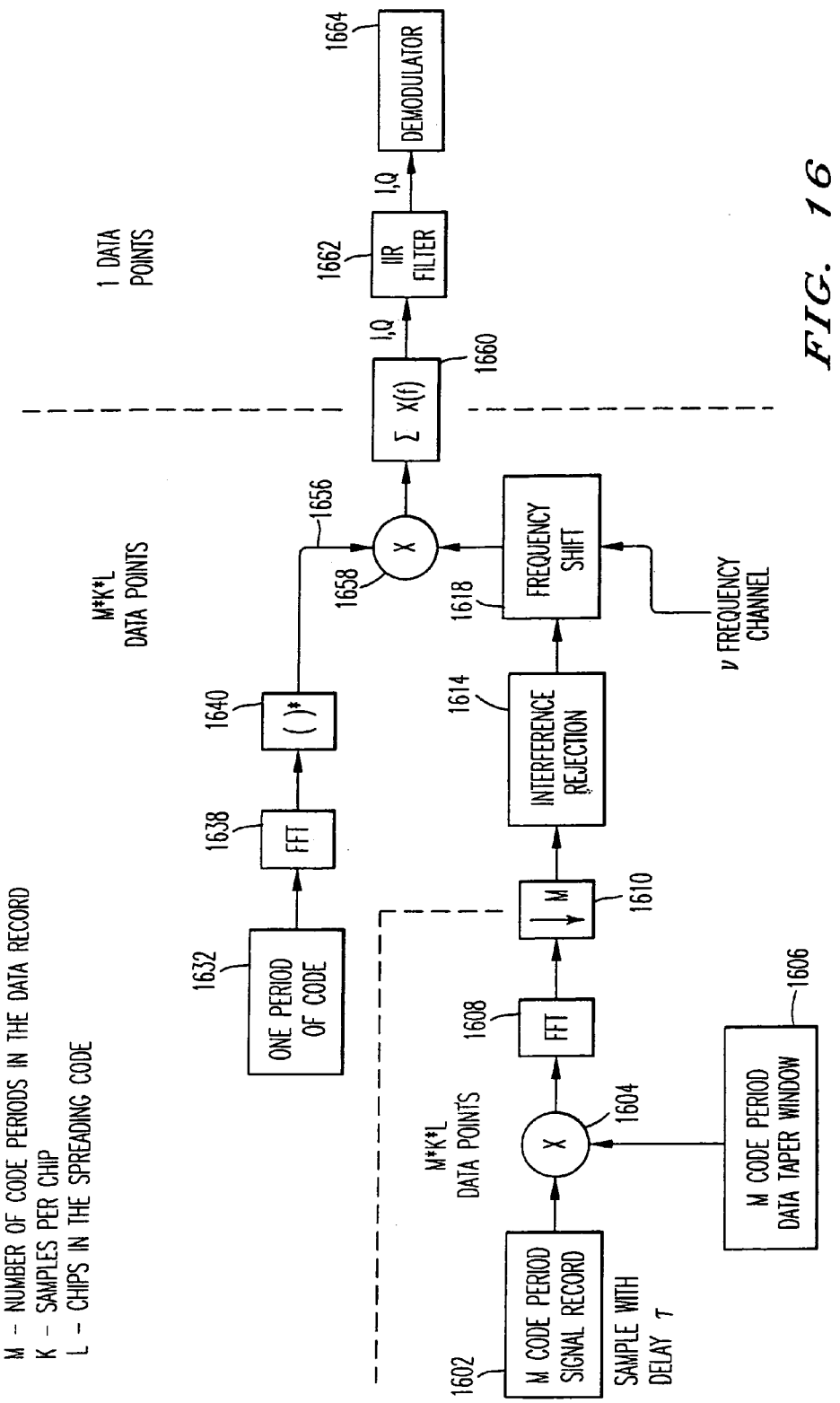

The steps in FIG. 15 represent the minimum number of steps in a frequency domain narrow-band interference rejecting despreader of the present invention. Additional steps are available to decrease computational loading of the DSP device. The first of these steps is shown in block 1610 of FIG. 16. This downsampling step reduces the computational load on the DSP by a factor of M, the number of code periods in the data record. M is equal to 3 in the preferred embodiment of the present invention. One skilled in the art recognizes that M can take on the value of one, two, or more. This also allows one period of code 1632 to be input into the process instead of the M periods of code 1532 from FIG. 15.

Figure 17:
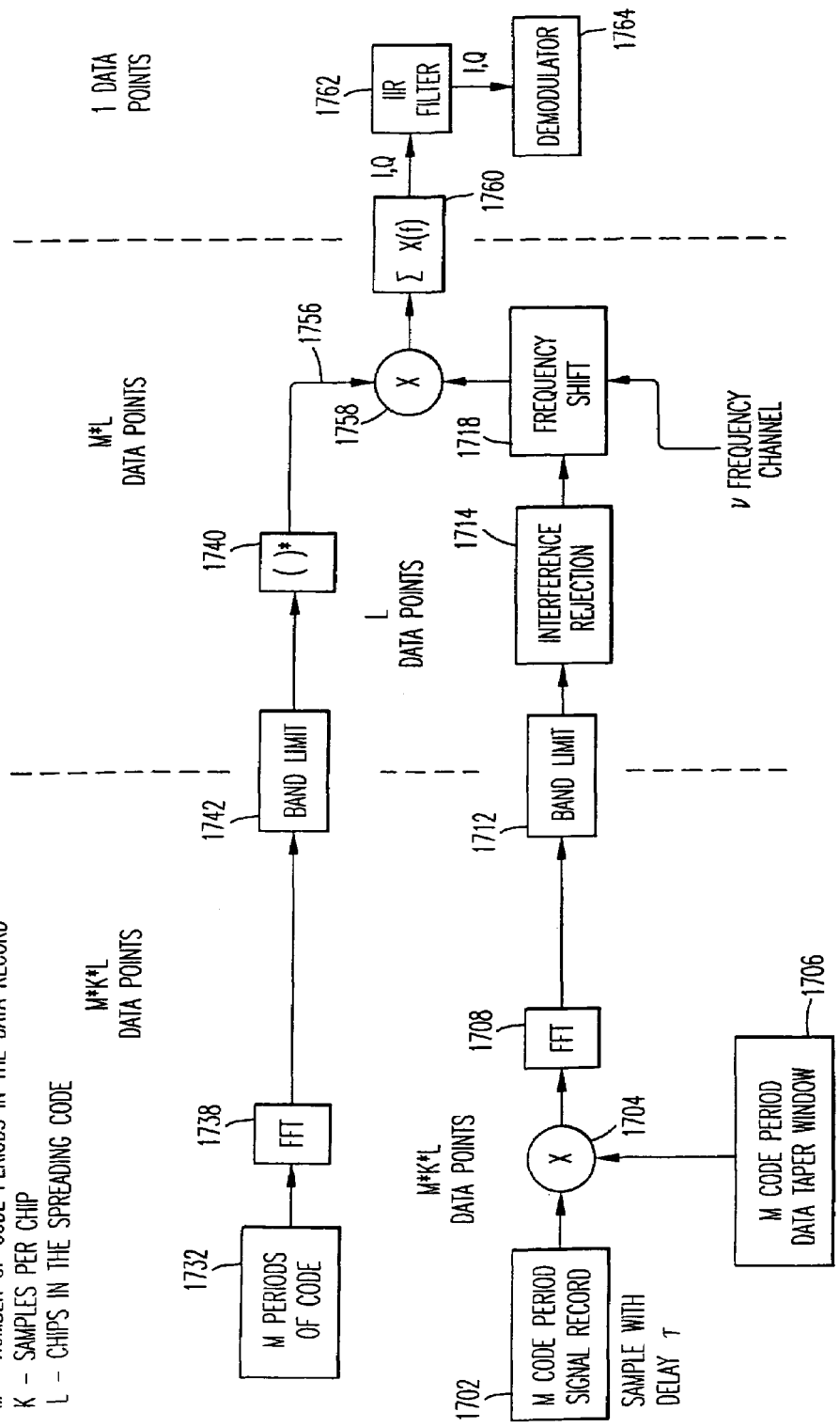

Alternately, band-limiting steps 1742 and 1712 are shown in FIG. 17 that retain only the center 1/K data points from both the code reference thread (blocks 1732, 1738, 1740, 1742, and 1756) and the desired signal input thread (blocks 1702, 1704, 1706, 1708, 1712, and 1718) in the frequency spectrum. This reduces the computational load on the DSP device by a factor of K. K is equal to 4 in the preferred embodiment of the present invention. One skilled in the art recognizes that K can take on the value of one, two, or more. This band-limiting step does not degrade the desired signal energy if the corresponding transmitter is similarly band-limited.

Figure 18:
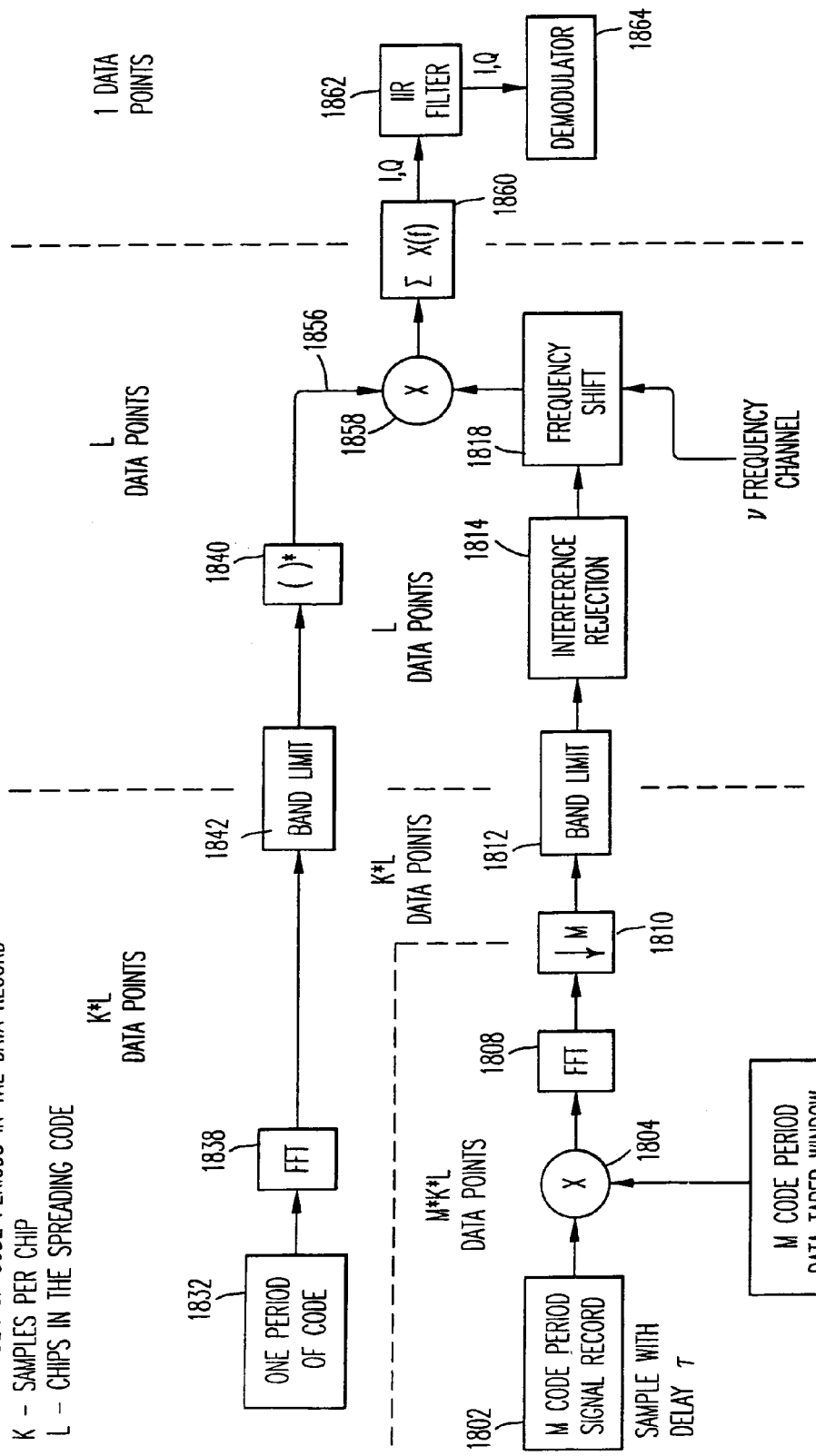

The method of FIG. 18 is the most computationally efficient implementation of a frequency domain narrowband interference rejecting spread spectrum receiver. FIG. 18 shows one period of the spreading code in block 1832, downsampling step 1810, and band-limiting steps 1842 and 1812. This provides highest efficiency by reducing the computational loading from (M*K*L) to L. L is the number of chips in the spreading code, which represents the minimum number of data points required by a spread spectrum receiver to demodulate a message symbol with full process gain. The order of blocks 1810 and 1812 is interchangeable.

The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform processes of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media, including hard drives, suitable for storing electronic instructions.

Various modifications and variations are possible in light of the above teachings. It is therefore to be understood that within the scope of the appended claims, the present invention may be practiced otherwise than as specifically described herein.

What is claimed is:

1. A method in a spread spectrum receiver for narrow-band interference rejection in a received signal transmitted by a spread spectrum transmitter, comprising:
   transforming the received signal to a frequency domain signal and identifying narrow-band interference components in the frequency domain signal;
   suppressing the identified narrow-band interference components by excising the identified narrow-band interference components from the frequency domain signal to produce an interference excised signal in the frequency domain, and storing in a memory frequencies corresponding to the identified narrow-band interference components;
   synchronizing a receiver code to a transmitter code in the frequency domain using the interference excised signal;
   generating coefficients for a time domain filter that includes notches at the frequencies corresponding to the excised narrow-band interference components and that jointly despreads and rejects narrow-band interference from said frequencies; and
   applying the coefficients generated in the preceding step to the time domain filter; and
   despreading and filtering in real time in the time domain the received signal using the applied coefficients.

2. The method of claim 1 further comprising:
   repeatedly performing at predetermined intervals said transforming, suppressing, coefficient generating and coefficient applying steps, whereby filtering by the time domain filter follows interfering signals of varying frequencies.

3. The method of claim 1, wherein:
said transforming step comprises,
sampling the received signal at K samples per chip for a duration of M code periods,
applying a data tapering window of M code periods to the sampled received signal to produce a windowed signal, and
Fourier transforming the windowed signal and producing a set of Fourier transform output points; and
said suppressing step comprises,
excising points from said set of Fourier transform output points that exceed the remaining points by a predetermined threshold, wherein K and M are predetermined values.

4. The method of claim 1, wherein:
said synchronizing step comprises,
determining a code delay and a frequency error between the transmitter and the receiver; and
said coefficient generating step uses the frequency error in generating said coefficients and said despreading and filtering step uses the code delay in despreading and filtering.

5. The method of claim 3 further comprising:
decimating said set of Fourier transform output points by a factor of M.

6. The method of claim 3 further comprising:
filtering said set of Fourier transform output points in a filter having a bandwidth corresponding to a chip rate of said spreading code by retaining 1/K of the output points centered on zero Hertz and zeroing the other points.

7. The method of claim 3 further comprising:
frequency shifting said excised set of Fourier transform output points by an amount sufficient to cancel an intermediate frequency.

8. The method of claim 1, wherein:
said generating coefficients step comprises,
Fourier transforming M periods of a spreading code at K samples per chip to produce a Fourier transformed code signal, the spreading code being the same as used at the transmitter to form the transmitted spread spectrum signal received by said receiver,
complex conjugating the Fourier transformed code signal to produce a reference code,
suppressing narrow-band interference by excising from the reference code the stored frequencies corresponding to the identified narrow-band interference components,
inverse Fourier transforming the excised reference code, and
applying a data tapering window of M code periods to the inverse Fourier transformed excised reference code to produce said coefficients, wherein K and M are predetermined values.

9. The method of claim 8, wherein:
said synchronizing step comprises determining a code delay and a frequency error between the transmitter and the receiver; and
said coefficient generating step removes a frequency error between the transmitter and the receiver by shifting said reference code an amount sufficient to cancel the frequency error.

10. The method of claim 8, wherein:
said generating coefficients step comprises,
Fourier transforming one period of a spreading code at K samples per chip to produce a Fourier transformed code signal, the spreading code being the same as used at the transmitter to form the transmitted spread spectrum signal received by said receiver,
complex conjugating the Fourier transformed code signal to produce a reference code, suppressing narrow-band interference by excising from the reference code the stored frequencies corresponding to the identified narrow-band interference components, upsampling the excised reference code by a factor of M corresponding to the number of code periods,
inverse Fourier transforming the upsampled excised reference code, and
applying a data tapering window of M code periods to the inverse Fourier transformed upsampled excised reference code to produce said coefficients.

11. The method of claim 8, further comprising:
filtering said reference code in a filter having a bandwidth corresponding to a chip rate of said spreading code by retaining 1/K of the reference code and zeroing the remainder of the reference code; and
zero padding said excised reference code by a factor K−1 prior to performing said inverse Fourier transforming step.

12. The method of claim 8, further comprising,
frequency shifting said reference code by an amount sufficient to cancel an intermediate frequency.

13. The method of claim 1, wherein:
said despreading and filtering step comprises,
sampling the received signal at K samples per chip for a duration of M code periods,
K matched filtering the signal samples using the applied coefficients to produce output samples at a message symbol rate, and
IIR filtering the output samples to cancel message intersymbol interference generated in the matched filter, wherein K and M are predetermined values.

14. A narrow-band interference rejecting spread spectrum receiver configured to receive a signal transmitted by a spread spectrum transmitter, comprising:
a transform mechanism configured to convert the received time domain signal to a frequency domain signal and to identify narrow-band interference components in the frequency domain signal;
an interference suppression mechanism configured to excise the identified narrow-band interference components from the frequency domain signal, to produce an interference excised signal in the frequency domain, and to store in a memory frequencies corresponding to the excised interference components;
a synchronizer configured to operate in the frequency domain to align a receiver code to a transmitter code using the interference excised signal;
a coefficient generator configured to generate coefficients for a time domain filter that includes notches at the frequencies corresponding to the excised narrow-band interference components and that jointly despreads and rejects narrow-band interference from said excised frequencies; and
a time domain filter coupled to the coefficient generator and having applied thereto the coefficients generated by the coefficient generator, said time domain filter configured to despread and filter in real time a received signal upon alignment of the receiver code to the transmitter code by the synchronizer.

15. The receiver of claim 14, further comprising:
a processor configured to control the transform mechanism, the interference suppressor, and the coefficient generator to operate repeatedly at predetermined intervals, whereby the time domain filter follows interfering signals of varying frequencies.

16. The receiver of claim 14, wherein:
said transform mechanism comprises,
a sampler configured to sample the received signal at K samples per chip for a duration of M code periods,
a windowing mechanism configured to apply a data tapering window of M code periods to the sampled received signal to produce a windowed signal, and
a Fourier transform mechanism configured to perform a Fourier transform of the windowed signal to produce a set of Fourier transform output points; and
said suppression mechanism comprises,
an excising mechanism configured to set to zero points from said set of Fourier transform output points that exceed the remaining points by a predetermined threshold, wherein K and M are predetermined values.

17. The receiver of claim 14, wherein:
said synchronizer comprises a resolver mechanism configured to determine a code delay and a frequency error between the transmitter and the receiver; and
said coefficient generator uses the frequency error in generating said coefficients and said time domain filter uses the code delay in despreading and filtering.

18. The receiver of claim 16, further comprising:
a downsampler configured to downsample said set of Fourier transform output points by a factor of M.

19. The receiver of claim 16, further comprising:
a filter configured to filter the set of Fourier transform output points, said filter having a bandwidth corresponding to a chip rate of said spreading code and configured to retain 1/K of the Fourier transform output points centered on zero Hertz and to set to zero the other Fourier transform output points.

20. The receiver of claim 16, further comprising:
a frequency shifter configured to shift the frequency of the excised set of Fourier transform output points by an amount sufficient to cancel an intermediate frequency.

21. The receiver of claim 14, wherein:
said coefficient generator comprises,
a Fourier transform mechanism configured to produce a Fourier transform of M periods of a spreading code at K samples per chip to produce a Fourier transformed code signal, the spreading code being the same as used at the transmitter to form the transmitted spread spectrum signal received by said receiver,
a complex conjugating mechanism configured to perform a complex conjugate of the Fourier transformed code signal to produce a reference code,
a narrow-band interference suppression mechanism configured to excise from the reference code the frequencies stored in the memory and corresponding to the identified narrow-band interference components,
an inverse Fourier transform mechanism configured to perform an inverse Fourier transform of the excised reference code, and
a windowing mechanism configured to apply a data tapering window of M code periods to the inverse Fourier transformed excised reference code to produce said coefficients, wherein K and M are predetermined values.

22. The receiver of claim 21, wherein:
said synchronizer comprises a resolver mechanism configured to determine a code delay and a frequency error between the transmitter and the receiver; and said coefficient generator is configured to remove a frequency error between the transmitter and the receiver by shifting said reference code an amount sufficient to cancel the frequency error.

23. The receiver of claim 21, wherein:
said coefficient generator comprises,
a Fourier transform mechanism configured to perform a Fourier transform of one period of a spreading code at K samples per chip to produce a Fourier transformed code signal, the spreading code being the same as used at the transmitter to form the transmitted spread spectrum signal received by said receiver,
a complex conjugate mechanism configured to perform a complex conjugate of the Fourier transformed code signal to produce a reference code,
a narrow-band interference suppression mechanism configured to excise from the reference code the frequencies corresponding to the identified narrow-band interference components stored in the memory,
an upsampling mechanism configured to upsample the excised reference code by a factor of M corresponding to the number of code periods to produce an upsampled excised reference code,
an inverse Fourier transform mechanism configured to perform an inverse Fourier transform of the excised reference code, and
a windowing mechanism configured to apply a data tapering window of M code periods to the inverse Fourier transformed upsampled excised reference code to produce said coefficients.

24. The receiver of claim 21, further comprising:
a filter configured to filter said reference code, said filter having a bandwidth corresponding to a chip rate of said spreading code and configured to retain 1/K of the reference code and to set to zero the remainder of the reference code; and
a zero padder mechanism configured to zero pad said excised reference code by a factor K−1 prior to said inverse Fourier transform.

25. The receiver of claim 21, further comprising,
a frequency shifter configured to shift the frequency of the reference code by an amount sufficient to cancel an intermediate frequency.

26. The receiver of claim 14, wherein:
said time domain filter comprises,
a sampler configured to sample the received signal at K samples per chip for a duration of M code periods,
a matched filter configured to filter the sampled received signal using the applied coefficients to produce output samples at a data symbol rate, and
an IIR filter configured to filter the output samples to cancel message intersymbol interference generated in the matched filter, wherein K and M are predetermined values.

27. A narrow-band interference rejecting device in a spread spectrum receiver, comprising:
means for transforming a received spread spectrum signal to a frequency domain signal and identifying narrow-band interference components in the frequency domain signal;
means for suppressing the identified narrow-band interference components by excising the identified narrow-band interference components from the frequency domain signal to produce an interference excised signal in the frequency domain, and means for storing in a memory frequencies corresponding to the identified narrow-band interference components;

means for synchronizing a receiver code to a transmitter code in the frequency domain using the interference excised signal;

means for generating coefficients defining filter notches at frequencies corresponding to excised narrow-band interference components and defining a despreading function; and means for despreading and filtering in real time in the time domain the received signal using the coefficients generated by said means for generating coefficients.

28. The receiver of claim 27, further comprising:

means for controlling said transforming means, said suppressing means and said coefficent generating means to operate repeatedly at predetermined time intervals so that said means for despreading and filtering follows interfering signals of varying frequencies.

29. A computer program product configured to store computer code for implementing the method of any one of claims 1–13.

* * * * *